(12) United States Patent
Chang et al.

(10) Patent No.: US 12,505,348 B2
(45) Date of Patent: Dec. 23, 2025

(54) PERSONALIZED NEURAL NETWORK PRUNING

(71) Applicant: QUALCOMM Incorporated, San Diego, CA (US)

(72) Inventors: Simyung Chang, Suwon (KR); Jangho Kim, Siheung (KR); Hyunsin Park, Gwangmyeong (KR); Juntae Lee, Seoul (KR); Jaewon Choi, Seoul (KR); Kyu Woong Hwang, Daejeon (KR)

(73) Assignee: Qualcomm Incorporated, San Diego, CA (US)

( * ) Notice: Subject to any disclaimer, the term of this patent is extended or adjusted under 35 U.S.C. 154(b) by 1010 days.

(21) Appl. No.: 17/506,646

(22) Filed: Oct. 20, 2021

(65) Prior Publication Data

US 2022/0121949 A1 Apr. 21, 2022

Related U.S. Application Data

(60) Provisional application No. 63/094,767, filed on Oct. 21, 2020.

(51) Int. Cl.
G06N 3/082 (2023.01)
G06F 18/20 (2023.01)

(52) U.S. Cl.
CPC .............. *G06N 3/082* (2013.01); *G06F 18/29* (2023.01)

(58) Field of Classification Search
CPC .................................. G06N 3/082; G06F 18/29
USPC ............................................................. 706/15
See application file for complete search history.

(56) References Cited

U.S. PATENT DOCUMENTS

2009/0307592 A1\* 12/2009 Kalanithi ................ G06F 3/002
715/763
2022/0059075 A1\* 2/2022 Thomson ................ G10L 15/08

FOREIGN PATENT DOCUMENTS

JP 4279965 B2 6/2009
JP 2020160764 A 10/2020
WO 2020112152 A1 6/2020

OTHER PUBLICATIONS

Chandakkar, et al., "Strategies for Re-Training a Pruned Neural Network in an Edge Computing Paradigm", 2017 IEEE 1st International Conference on Edge Computing, 2017 (Year: 2017).\*
Courbariaux M., et al., "Binarized Neural Networks: Training Neural Networks with Weights and Activations Constrained to +1 or −1", University of Montreal, Mar. 17, 2016, 11 Pages, arXiv preprint arXiv:1602.02830v3 [cs.LG].
Han S., et al., "Deep Compression: Compressing Deep Neural Networks with Pruning, Trained Quantization and Huffman Coding", International Conference on Learning Representations Conference paper 2016, arXiv:1510.00149v5 [cs.CV] Feb. 15, 2016 (Feb. 15, 2016), 14 pages.

(Continued)

*Primary Examiner* — Tsu-Chang Lee
(74) *Attorney, Agent, or Firm* — Seyfarth Shaw LLP

(57) ABSTRACT

A method for generating a personalized model includes receiving one or more personal data samples from a user. A prototype of a personal identity is generated based on the personal data samples. The prototype of the personal identity is trained to reflect personal characteristics of the user. A network graph is generated based on the prototype of the personal identity. One or more channels of a global network are pruned based on the network graph to produce the personalized model.

24 Claims, 10 Drawing Sheets

(56) References Cited

OTHER PUBLICATIONS

He J., et al., "On-Device Few-shot Personalization for Real-time Gaze Estimation", Date of Conference: Oct. 27-28, 2019, 10 Pages.
He K., et al., "Deep Residual Learning for Image Recognition", IEEE Conference on Computer Vision and Pattern recognition, 2016, pp. 770-778.
Hinton G., et al., "Distilling the Knowledge in a Neural Network", NIPS 2014, arXiv:1503.02531 [stat.ML] Mar. 9, 2015, pp. 1-9, URL:https://arxiv.org/pdf/1503.02531.
Jang E., et al., "Categorical Reparameterization with Gumbel-Softmax", International Conference on Learning Representations 2017 Conference, Cornell University Library, Aug. 5, 2017, XP080729237, pp. 1-13, arXiv:1611.01144v5.
Kim J., et al., "Feature Fusion for Online Mutual Knowledge Distillation", arXiv:1904.09058v2 cs.CV] Jul. 21, 2020, 11 Pages.
Kim J., et al., "Paraphrasing Complex Network: Network Compression via Factor Transfer", 32nd Conference on Neural Information Processing Systems (NeurIPS 2018), Montreal, Canada, arXiv:1802.04977v3 [cs.CV] Jul. 22, 2020, pp. 1-13.
Kim J., et al., "Position-Based Scaled Gradient for Model Quantization and Pruning", 34th Conference on Neural Information Processing Systems (NeurIPS 2020), Vancouver, Canada, arXiv:2005.11035v4 [cs.CV] Nov. 11, 2020, pp. 1-19.
Kim B., et al., "Query-By-Example On-Device Keyword Spotting", Qualcomm AI Research, arXiv:1910.05171v3 [cs.LG] Jan. 14, 2020, 7 Pages.
Krizhevsky A., "Learning Multiple Layers of Features from Tiny Images", Technical Report, Citeseer, Apr. 8, 2009, 60 Pages.
Lee S., et al., "URNet: User-Resizable Residual Networks with Conditional Gating Module", The Thirty-Fourth AAAI Conference on Artificial Intelligence (AAAI-20), 2020, pp. 4569-4576.
Lin J., et al., "Runtime Neural Pruning", 31st Conference on Neural Information Processing Systems (NIPS 2017), Long Beach, CA, USA, 2017, pp. 1-11.
Rastegari M., et al., "XNOR-Net: ImageNet Classification Using Binary Convolutional Neural Networks", Aug. 2, 2016, 17 pages.
Snell J., et al., "Prototypical Networks for Few-shot Learning", 31st Conference on Neural Information Processing Systems (NIPS 2017), Long Beach, CA, 2017, pp. 1-11.
Tang R., et al., "Deep Residual Learning for Small-Footprint Keyword Spotting", arXiv:1710.10361v2 [cs.CL] Sep. 21, 2018, 5 Pages.
Wang J., et al.,"Centroid-Based Deep Metric Learning For Speaker Recognition", arXiv:1902.02375v1 [cs.LG] Feb. 6, 2019, 5 Pages.
Warden, P., "Launching the Speech Commands Dataset", Google Research Blog, Aug. 24, 2017, 3 Pages.
Xue J., et al., "Singular Value Decomposition based Low-footprint Speaker Adaptation and Personalization for Deep Neural Network", 2014 IEEE International Conference on Acoustics, Speech and Signal Processing (ICASSP), IEEE, May 4, 2014 (May 4, 2014). pp. 6359-6363, XP032617895, DOI: 10.1109/ICASSP.2014.6854828 [retrieved on Jul. 11, 2014].
Hjemmat M., et al., "CAP'NN: Class-Aware Personalized Neural Network Inference", 2020 57th ACM/IEEE Design Automation Conference (DAC), IEEE, Jul. 20, 2020 (Jul. 20, 2020), 6 Pages, DOI:10.1109/DAC18072.2020.9218741, [retrieved on Oct. 8, 2020].
International Search Report and Written Opinion—PCT/US2021/056015—ISA/EPO—Feb. 11, 2022.
Kim J., et al., "Prototype-Based Personalized Pruning", ICASSP 2021-2021, IEEE International Conference on Acoustics, Speech and Signal Processing (ICASSP), IEEE, Jun. 6, 2021 (Jun. 6, 2021), pp. 3925-3929, XP033954802, DOI:10.1109/ICASSP39728.2021.9414526, [retrieved on Apr. 22, 2021].
Veit A., et al., "Convolutional Networks with Adaptive Inference Graphs", Oct. 6, 2018, Advances in Biometrics: International Conference, ICB 2007, Seoul, Korea, Aug. 27-29, 2007, Proceedings, [Lecture Notes in Computer Science, Lect.Notes Computer], Springer, Berlin, Heidelberg, pp. 3-18, XP047488279, ISBN: 978-3-540-74549-5, [retrieved on Oct. 6, 2018].

\* cited by examiner

- Personalized Pruning
  - Selection (forward)
  - Large to small

Full model

Select

After personalized pruning

PERSONALIZED NEURAL NETWORK PRUNING

CROSS-REFERENCE TO RELATED APPLICATION

The present application claims the benefit of U.S. Provisional Patent Application No. 63/094,767, filed on Oct. 21, 2020, and titled "PERSONALIZED NEURAL NETWORK PRUNING," the disclosure of which is expressly incorporated by reference in its entirety.

FIELD OF DISCLOSURE

Aspects of the present disclosure generally relate to generating personalized neural networks.

BACKGROUND

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Edge devices such as smartphones are widely used. Given the many useful applications of neural networks, there is increasing demand for use on edge devices and for personalized services for such edge devices. However, edge devices have limited computational resources and generalized models may utilize more complex networks and more computation. As such, conventional personalization methods may not be suitable for edge devices because conventional approaches use retraining or fine-tuning with limited personal data. Unfortunately, these multiple trainings generally have a substantial computational cost during on-device learning, which are overly burdensome for edge devices.

SUMMARY

The present disclosure is set forth in the independent claims, respectively. Some aspects of the disclosure are described in the dependent claims.

In an aspect of the present disclosure, a computer-implemented method is provided. The method includes receiving one or more personal data samples. The method also includes generating a prototype of a personal identity based on the personal data samples. The prototype of the personal identity is trained to reflect personal characteristics of a user. Additionally, the method includes generating a network graph based on the prototype of the personal identity. Further, the method includes pruning one or more channels of a global network based on the network graph to produce a personalized model.

In another aspect of the present disclosure, an apparatus is provided. The apparatus includes a memory and one or more processors coupled to the memory. The processor(s) are configured to receive one or more personal data samples. The processor(s) are also configured to generate a prototype of a personal identity based on the personal data samples. The prototype of the personal identity is trained to reflect personal characteristics of a user. In addition, the processor(s) are configured to generate a network graph based on the prototype of the personal identity. Further, the processor(s) are configured to prune one or more channels of a global network based on the network graph to produce a personalized model.

In another aspect of the present disclosure, an apparatus is provided. The apparatus includes means for receiving one or more personal data samples. The apparatus also includes means for generating a prototype of a personal identity based on the personal data samples. The prototype of the personal identity is trained to reflect personal characteristics of a user. Additionally, the apparatus includes means for generating a network graph based on the prototype of the personal identity. Further, the apparatus includes means for pruning one or more channels of a global network based on the network graph to produce a personalized model.

In a further aspect of the present disclosure, a non-transitory computer readable medium is provided. The computer readable medium has encoded thereon program code. The program code is executed by a processor and includes code to receive one or more personal data samples. The program code also includes code to generate a prototype of a personal identity based on the personal data samples. The prototype of the personal identity is trained to reflect personal characteristics of a user. Additionally, the program code includes code to generate a network graph based on the prototype of the personal identity. Furthermore, the program code includes code to prune one or more channels of a global network based on the network graph to produce a personalized model.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
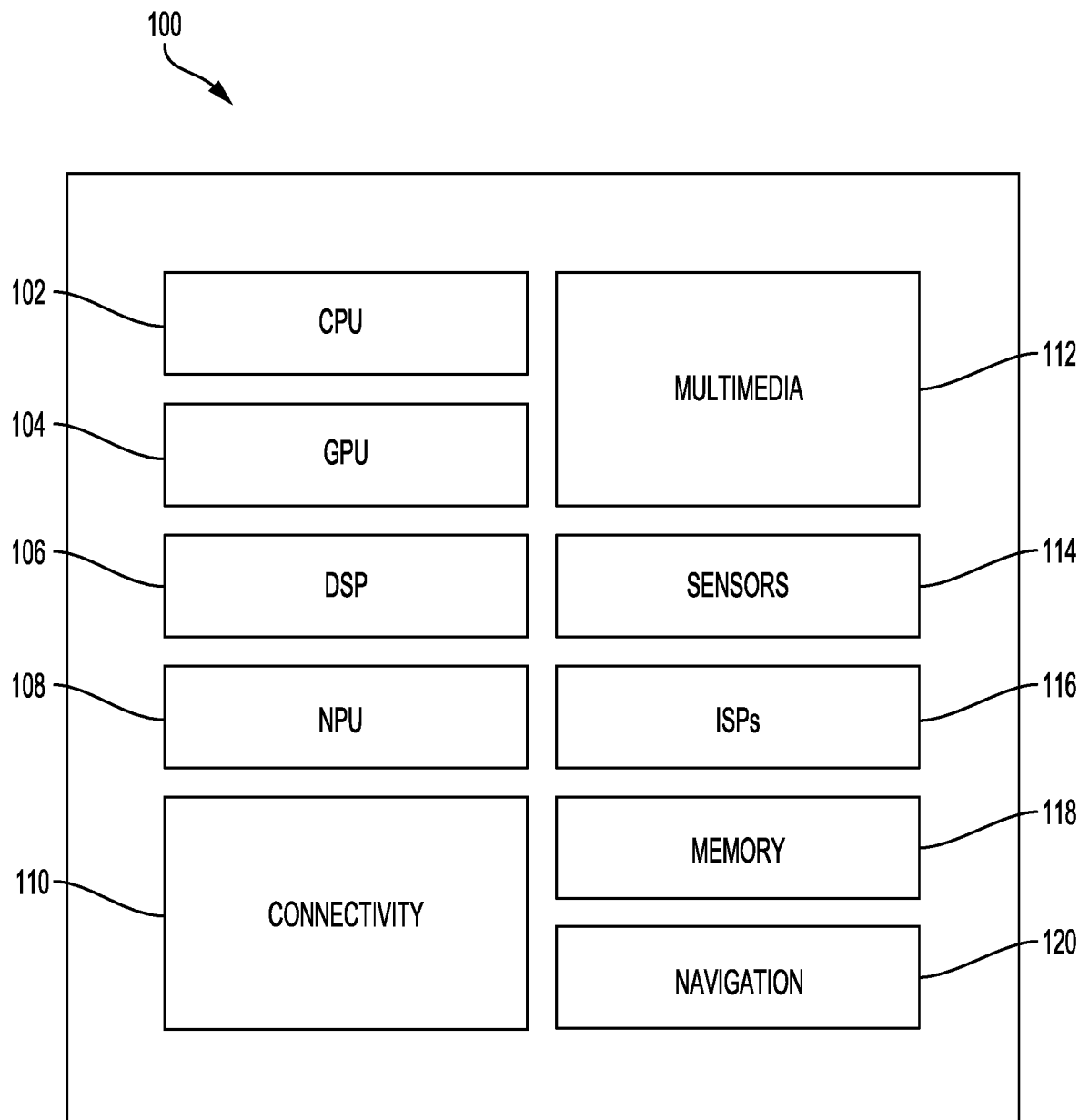
FIG. 1 illustrates an example implementation of a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Personalization for deep neural networks is an important topic in computer vision and signal processing with numerous applications such as recommender systems, smart assistance, speaker verification, and keyword spotting. Because of the broad appeal, a generalized model may be distributed to numerous users. Each user may have data that is locally generated and/or unique to that user such as data developed via the user's camera, microphone, or a sensor on the user's edge device. Such data may be referred to as personal data. Personalization of a global model may have conflicting objectives of performing well on personal data with relatively few samples, while continuing to perform well on general data. Training a global model to perform well in many applications relies on training data to cover all circumstances for generalization. However, this assumption departs from real world scenarios.

One approach to personalize the deep neural network is to fine-tune the global model with limited personal data. However, it is not practical to store an individual global deep neural network (DNN) model on memory restricted edge devices and it is hard to optimize the DNN model with limited personal data. That is, deploying a DNN requires powerful computation resources, so deploying a DNN on edge devices is a challenging problem because of the memory constraints and computation load. To resolve this issue, many model compression methods, such as knowledge distillation, model quantization, and model pruning, have been considered. However, such conventional methods involve an additional training phase or retraining. Therefore, an additional computational cost may be unavoidable.

Aspects of the present disclosure are directed to prototype-based personalized pruning (PPP), which learns a metric space using a prototype representation. PPP considers the model complexity as well as personalization. PPP selects a subset graph with a prototype module using the prototype of a personal identity driven from limited personalized data. For this reason, the model structure of PPP may be dynamically customized to enhance personalization and reduce the model complexity. In accordance with aspects of the present disclosure, a prototype of a personal identity for each group of personal data. A prototype may represent characteristics of personal data. A dynamic path network may be trained for personalized pruning to produce a personalized model, which is a pruned version of a generalized or full model without fine-tuning with the personal data.

FIG. 1 illustrates an example implementation of a system-on-a-chip (SOC) 100, which may include a central processing unit (CPU) 102 or a multi-core CPU configured for personalized neural network pruning. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive one or more personal data samples. The general-purpose processor 102 may also include code to generate a prototype of a personal identity based on the personal data samples. The prototype of a personal identity is trained to reflect personal characteristics of a user. The general-purpose processor 102 may also include code to generate a network graph based on the prototype of a personal identity. The general-purpose processor 102 may further include code to prune one or more channels of a global network based on the network graph to produce a personalized model.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
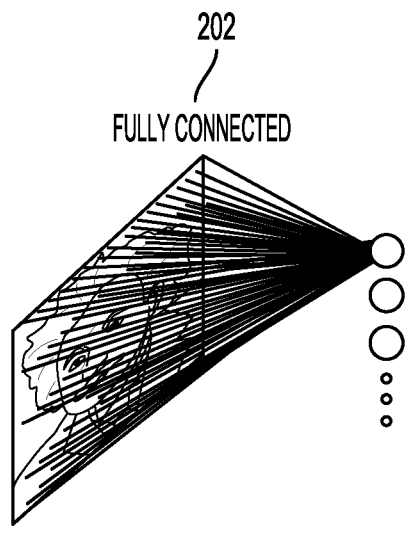
FIGS. 2A, 2B, and 2C are diagrams illustrating a neural network, in accordance with aspects of the present disclosure.
Figure 2B:
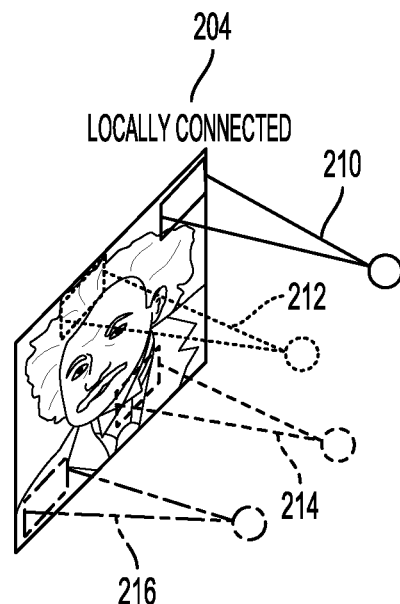

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
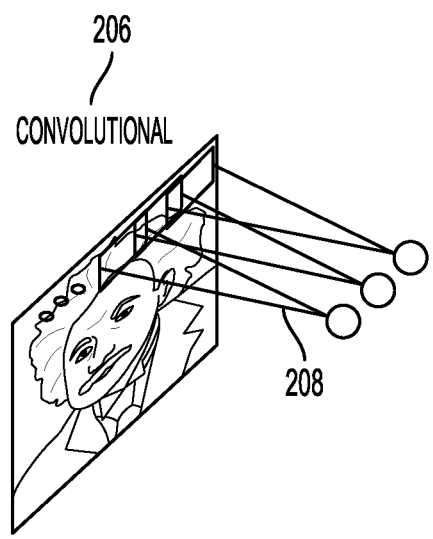

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
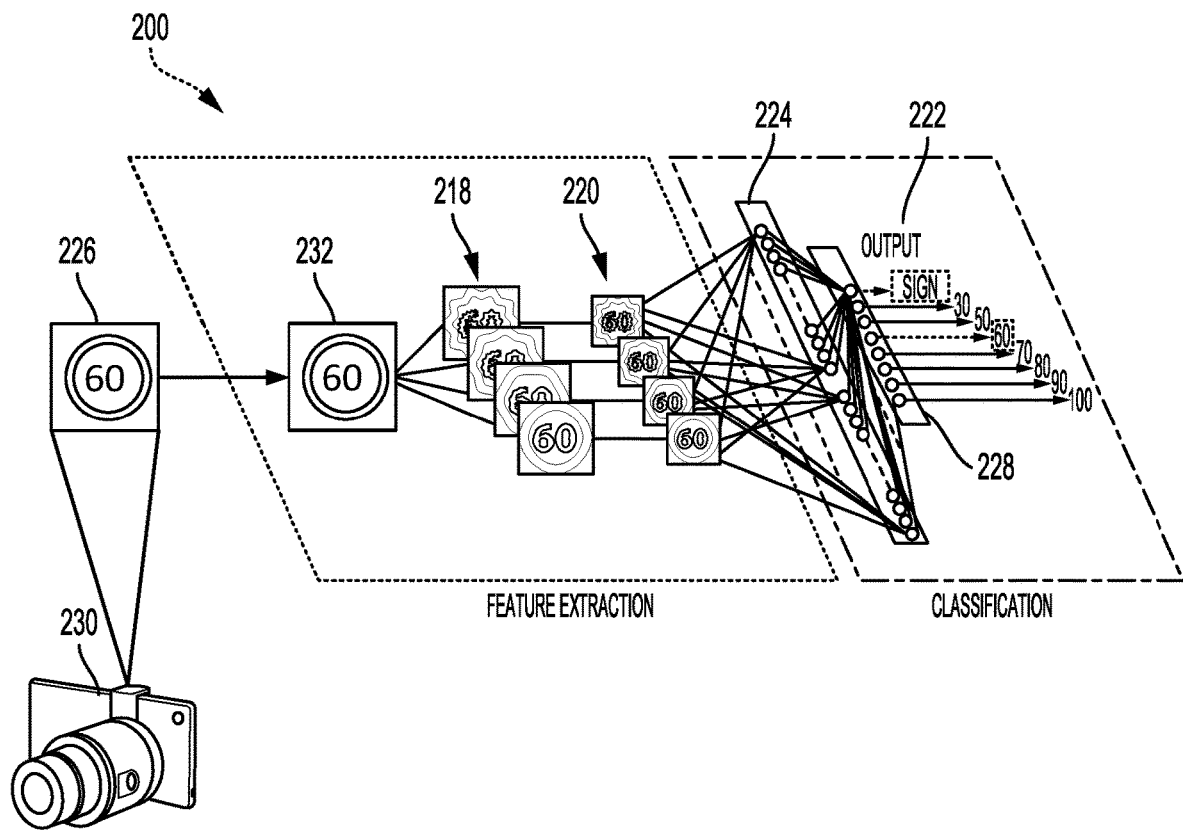
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, $\max(0, x)$. Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
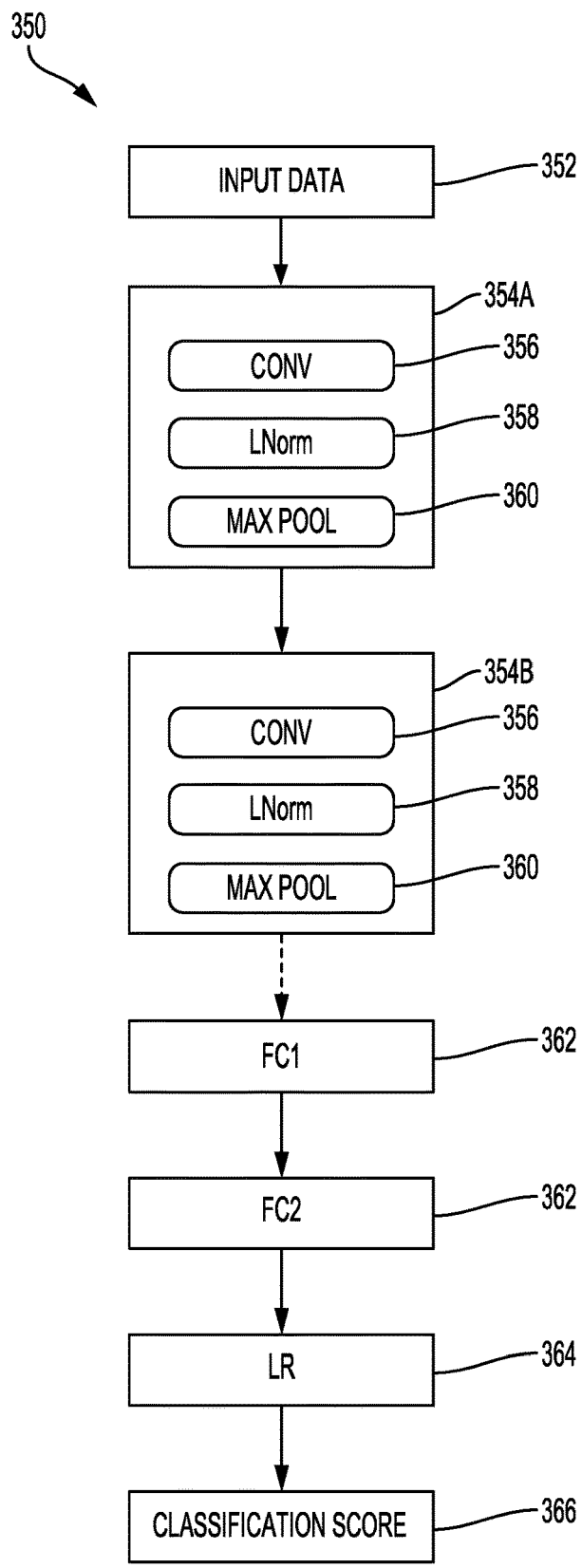
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolutional layer (CONV) 356, a normalization layer (LNorm) 358, and a max pooling layer (MAX POOL) 360.

The convolutional layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Aspects of the present disclosure are directed to a prototype-based personalized pruning (PPP) model, which learns a metric space using a prototype representation. PPP considers the model complexity as well as personalization. PPP selects a subset graph with a prototype module using the prototype of a personal identity driven from limited personalized data. For this reason, the model structure of PPP may be dynamically customized to enhance personalization and reduce the model complexity. In accordance with aspects of the present disclosure, a prototype of a personal identity may be generated for each personality, which may be defined as each identity or group of personal data. A prototype of a personal identity represents characteristics of personal data. A dynamic path network may be trained for personalized pruning to produce a personalized model, which is a pruned version of a generalized or full model without fine-tuning with the personal data.

In a training phase, a gate module may be trained to select proper channels for pruning. At the same time, personalization is also considered. A prototype of a personal identity may be defined using the output of a gate module. The output of the gate module is a binary embedding pattern for each convolution module indicating whether to prune each channel or not. To consider the performance after pruning with the prototype of a personal identity at a training phase, the output of the gate module may be regularized such that it is similar to that of prototype of a personal identity. As a result, after training, the global model may be more easily pruned by pruning with the prototype of a personal identity derived from the given restricted personal data using, for example, a graph generator and a network pruner. Furthermore, after training, PPP may operate without the global model (e.g., full model) because the channel selection is based on the prototype of a personal identity representing the personal data rather than an incoming input used in a conventional dynamic path network.

The architecture of the PPP may be a convolutional neural network (e.g., 350 shown in FIG. 3), for example. The convolutional neural network may be configured with a gate module that controls each channel of a convolution module. A gate g may be provided for each convolutional layer and $g: x \rightarrow z$, $\mathbb{R}^n \rightarrow \mathbb{R}^m$, where x is an input of the gate module, z is an embedding vector in the gating embedding space, and n and m are the dimensions of input and output channels of the convolutional layer related to the gate module, respectively. A global average pooling layer may serve as input x and broadcasting operation with m so there is no spatial dimension. Embedding vector z may learn whether or not to use a channel with probability p, which is a random variable with a range of [0,1]. A softmax (e.g., a Gumbel softmax) operation may be applied along with a straight through estimator for training the gate module. Accordingly, in a forward pass, an argmax function may be applied with a probability p for making hard attention ($z \in \{0,1\}$), but a gradient may be relaxed using a softmax in place of argmax, such that a sample may be expressed by the vector $\hat{X}$ as follows: $\hat{X}_k = \text{softmax}((\log \alpha_k + G_k)/\tau)$, where $\hat{X}_k$ is the $k^{th}$ element in $\hat{X}$, $G_k$ is a sequence of independent, and identically distributed random variables, and $\tau$ is a temperature parameter of the softmax function.

The PPP model may be trained based on the global model. The training dataset $D = \{(x_1, t_1), \ldots, (x_N, t_N)\}$, $t_i \in \{1, \ldots, K\}$, where K means the number of classes. The parameters $x_i^p$, $t_i^p$ denote an i-th data pair corresponding to a p-th identity (e.g., identity of an individual client). A convolutional layer may be specified as $f: x \rightarrow y$, $\mathbb{R}^{n \times w \times h} \rightarrow \mathbb{R}^{m \times w \times h}$ where h and w correspond to the height and width of the activation, respectively, x is an input activation and y is the output of the convolutional layer:

$$y_i^p = f(x_i^p, \theta_{f,l}), z_i^p = g(x_i^p, \theta_{g,l}) \quad (1)$$

where $\theta_{f,l}$ and $\theta_{g,l}$ are parameters for the l-th convolutional layer and gate module, respectively.

An output feature map and embedding vector may be calculated according to personal identity per mini-batch. To train the gate module for channel selection, the pruned channel is calculated using a broadcasting operator $(y_i^p = y_i^p \cdot z_i^p)$ for every convolutional layer.

A prototype may represent a personal identity. In each mini-batch, the number of specific p-th identity data is $n_p$. Then, the mean of embedding vectors among all $z^p$ is calculated. The parameter $\bar{z}^p$ is defined as the mean vector of all p identity in a same batch, representing the personality of p:

$$\bar{z}^p = \frac{1}{n_p} \sum_{i=1}^{n_p} z_i^p. \quad (2)$$

The set of mean vectors of all p identity in same a batch $\bar{z}^p$ may be calculated for all convolutional layers. This set of $\bar{z}^p$ is a prototype of p. This prototype of a personal identity is not discrete because of the mean operation. In a testing phase, which uses a pruned model, the prototype of a personal identity may be a discrete vector. In some aspects, the prototype of a personal identity may be converted to a discrete vector using an element-wise step function $S: \mathbb{R}^m \rightarrow \mathbb{R}^m$ and threshold value $\tau$:

$$\forall\, i,\, s(x_i)_i = \begin{cases} 1 & x_i \geq \tau \\ 0 & \text{Otherwise} \end{cases}. \quad (3)$$

A regularization loss for personalization may be calculated as follows:

$$L_{prototype} = \frac{1}{|C|} \sum_{c \in C} \frac{1}{|B| \times m} \sum_{p=1}^{P} \sum_{i=1}^{n_p} \|(z_{i,c}^p - S(\overline{z}_c^p))\|_2^2 \quad (4)$$

where C is a set of convolutional layers in the network, B is a mini batch including several identities and P is the number of personal identities.

The loss $L_{prototype}$ regularizes each group of personal data to select the similar gate pattern such as prototype of a personal identity $S(\overline{z}_c^p)$. Accordingly, the neural network may be pruned based on the $S(\overline{z}_c^p)$. PPP may be dependent on a prototype of a personal identity representing the group of personal data rather than an incoming input. In addition, the regularization loss $L_{prototype}$ may be computed without a distance metric between prototypes.

A target loss may serve as a soft constraint for a utilization rate of the network. The number of all alive channels (filters) in each convolutional layer may be counted and the utilization rate may be regularized with a specific target. As such, the target loss may be given by:

$$L_{target} = \left( \text{target} - \frac{1}{|C|} \sum_{c \in C} \frac{1}{|B| \times m} \sum_{p=1}^{P} \sum_{i=1}^{n_p} \|z_{i,c}^p\| \right)^2 \quad (5)$$

Accordingly, the target loss $L_{target}$ may provide an instrument for adjusting or controlling the network complexity. Using the standard cross-entropy loss, $L_{task}$, the overall training loss may be expressed as:

$$L_{total} = L_{task} + \alpha L_{prototype} + \beta L_{target} \quad (6)$$

where $\alpha$ and $\beta$ are the hyper-parameters for balancing the losses.

Unlike conventional techniques that use a data-dependent path that always uses a full network (e.g., because it selects the forward graph based on the input), after the training, PPP is independent of the input. Rather, in accordance with aspects of the present disclosure, the forward graph may be dependent on the prototype of given personal data. Thus, unlike conventional personalization schemes, such as fine-tuning the global model with personal data, PPP generates a personal model on the fly, thereby reducing computationally complexity.

In a testing phase, with little given personal data, the prototype of a personal identity may be calculated using Equation 2. With the calculated prototype of a personal identity, the personalized pruned model may be generated by eliminating or pruning the convolutional layer filter with a given binary pattern for each specific personalization using the graph generator and network pruner without additional training. In some aspects, the pruning may repeat to further enhance the personalized model.

Figure 4:
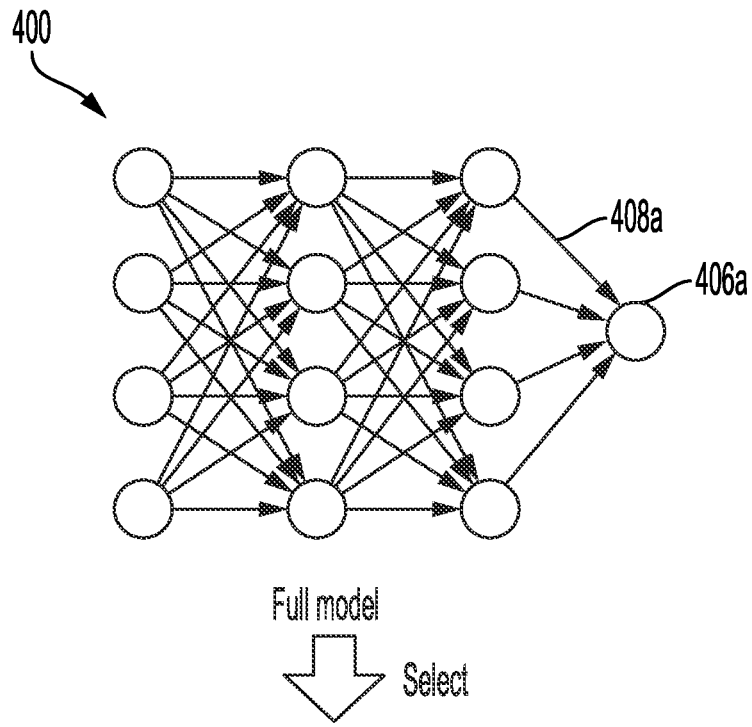
FIG. 4 is a block diagram illustrating an example pruning of a graph of a full or global model to generate a personalized model, in accordance with aspects of the present disclosure.
Figure 4:
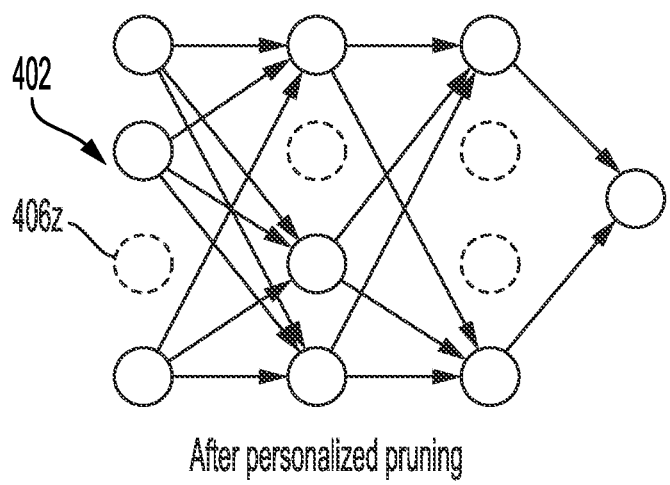

FIG. 4 is a block diagram illustrating an example pruning of a graph of a full or global model 400 to generate a graph of personalized model 402, in accordance with aspects of the present disclosure. Referring to FIG. 4, the graph of a full model 400 may include multiple nodes (e.g., 406a) with interconnections (e.g., 408a) between the nodes (e.g., 406a). The graph of the full model 400 may represent a convolutional neural network (e.g., 350 shown in FIG. 3). Each column of nodes (e.g., 406a) of the full model 400 may correspond to a convolutional layer (e.g., 356 shown in FIG. 3) of the convolutional neural network, for example. Each interconnection 408a may represent a channel to a node. If all channels to or from a node (e.g., 406z) are prune or removed, then the node (e.g., 406z) may be considered removed.

In accordance with aspects of the present disclosure, the full model 400 may be pruned using personal data to remove or eliminate interconnections 408a or channels. As described, the convolutional neural network may be configured with a gate module that controls each channel of a convolution module. A gate g may be provided for each convolutional layer and $g: x \to z$, $\mathbb{R}^n \to \mathbb{R}^m$, where x is an input of the gate module, z is an embedding vector in the gating embedding space, and n and m are the dimensions of input and output channels of the convolutional layer related to the gate module, respectively. Spatial global average pooling to the input x may be employed. Using the embedding vector z the gate module may learn whether or not to use a channel with probability p, which is a random variable with a range of [0,1]. In some aspects, a Gumble softmax and straight through estimator may be used for training gate modules. That is, in a forward pass of the neural network, argmax with a probability p for making hard attention ($z \in \{0,1\}$, while the gradient may be calculated via the Gumble softmax.

In turn, each node without connections to another node (shown with dashed lines 406z) may also be removed. By removing the interconnections 408a and nodes 406a, the personalized model 402 may be produced. In doing so, the network size and computational complexity may be reduced.

Figure 5:
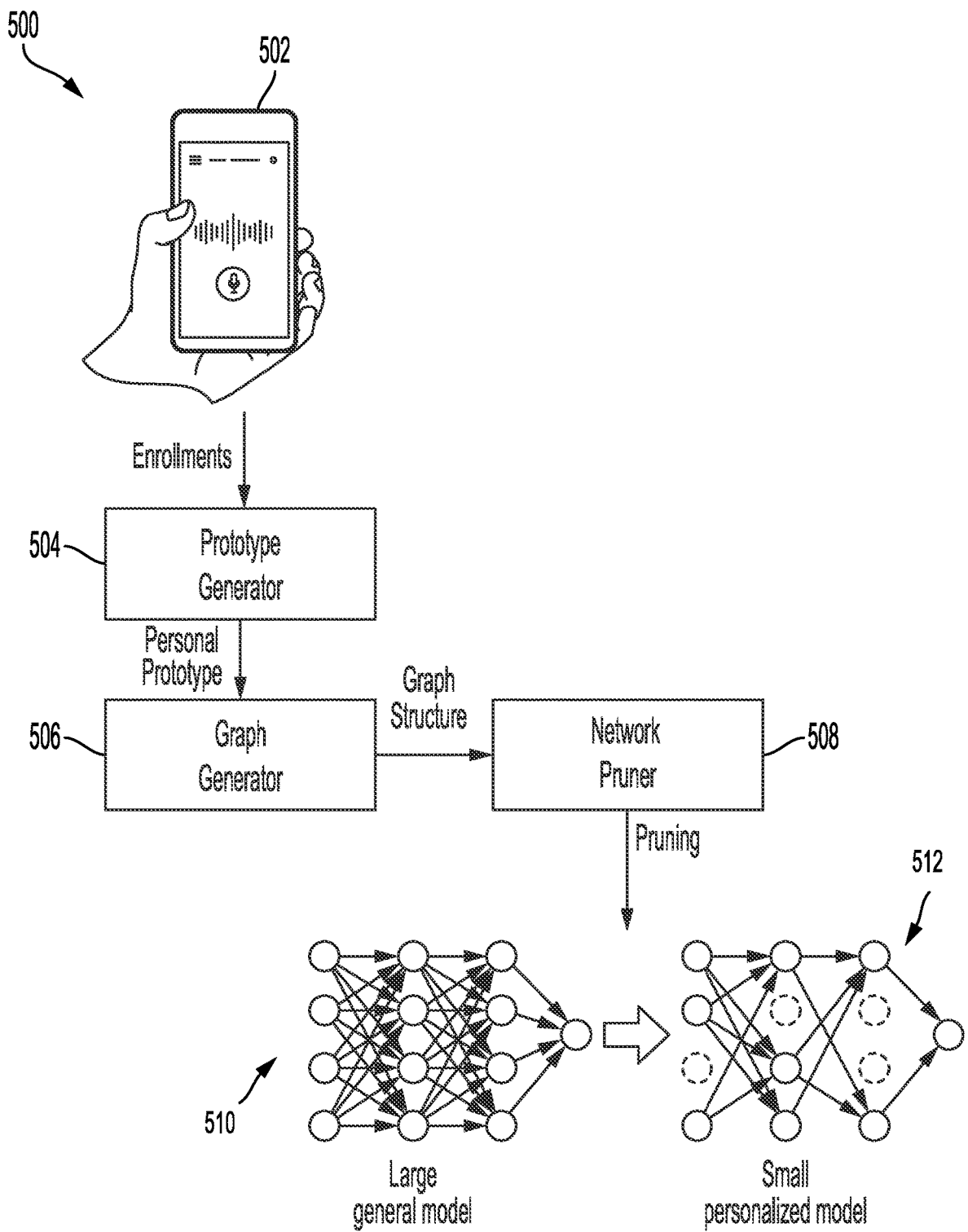
FIG. 5 is a block diagram illustrating an example implementation of a personalized model, in accordance with aspects of the present disclosure.

FIG. 5 is a block diagram 500 illustrating an example implementation of a personalized model, in accordance with aspects of the present disclosure. Referring to FIG. 5, a smartphone 502 may register enrollments for voice assistance activation, for example. A prototype generator 504 may create a user's prototype based on enrollment samples. A graph generator 506 may determine the network graph (structure) based on the user prototype of a personal identity. The graph structure may be supplied to a network pruner 508, which in turn, may generate a personalized model by pruning the network based on the determined network graph. In some aspects, the pruned model may also be fine-tuned with user samples. Accordingly, user's voice may be processed through the small personalized network.

Figure 6A:
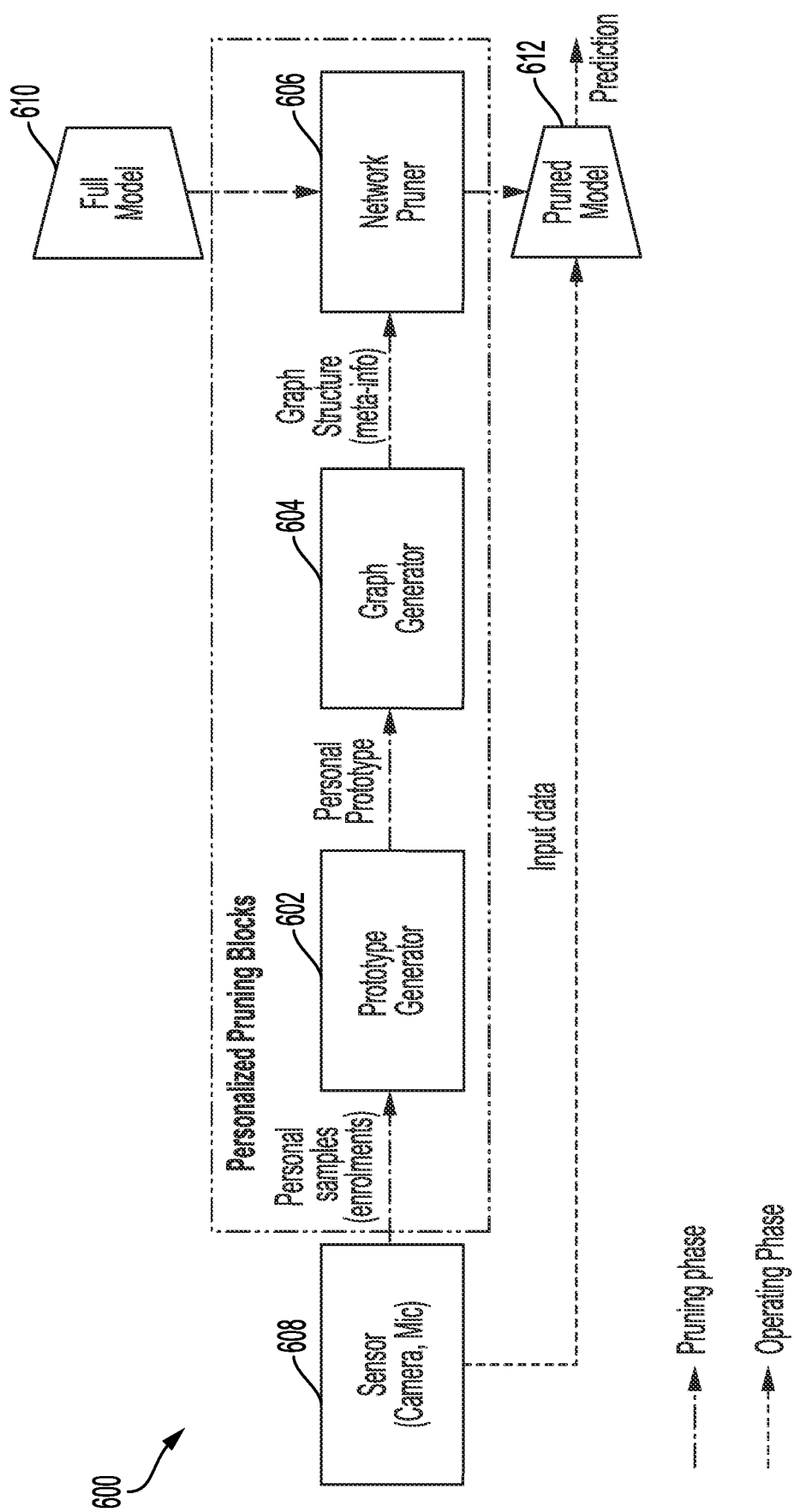
FIGS. 6A and 6B are block diagrams illustrating prototype-based personalized pruning (PPP) models, in accordance with aspects of the present disclosure.
Figure 6B:
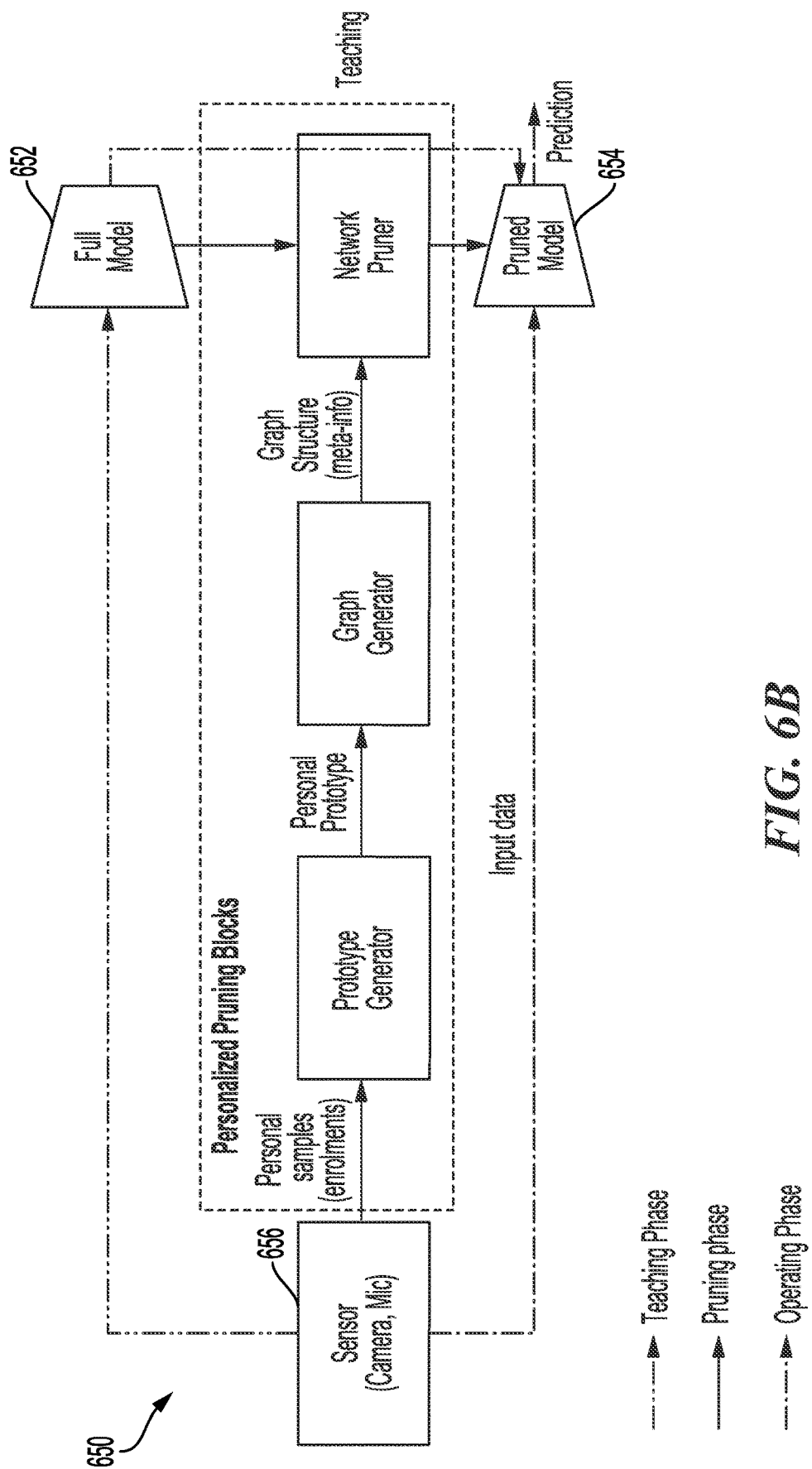

FIGS. 6A and 6B are block diagrams illustrating example prototype-based personalized pruning (PPP) models 600 and 650, respectively, in accordance with aspects of the present disclosure. Referring to FIG. 6A, the PPP model 600 includes a prototype generator 602, a graph generator 604, and a network pruner 606. The prototype generator 602 may generate a prototype of a personal identity based on personal data samples, such as those via a sensor 608 (e.g., a camera or microphone). The prototype generator 602 may supply personal prototypes to the graph generator 604. The graph generator 604, in turn, may determine a network graph structure based on the personal prototypes. The graph structures may then be supplied, for example, as meta-information to the network pruner 606. Using a full model 610, the network pruner 606 performs a binary determination removing channels of the full model 610, according to the determined graph to generate a small personalized model (shown as a pruned model 612). During operation, input data may be supplied via the sensor 608 to the pruned model 612 to generate a prediction (e.g., a classification of an image or indication that a keyword has been detected).

Referring to FIG. 6B, the PPP model 650 may be further configured for knowledge transfer from a full model 652. The PPP model 650 may have a similar configuration and function as that of the PPP model 600. In a teaching phase, the data from a sensor 656 (e.g., a camera or microphone) may be supplied to the full model 652. The full model 652 may generate a prediction, which may then be supplied to the pruned model 654 to further train the personalized model.

Figure 6C:
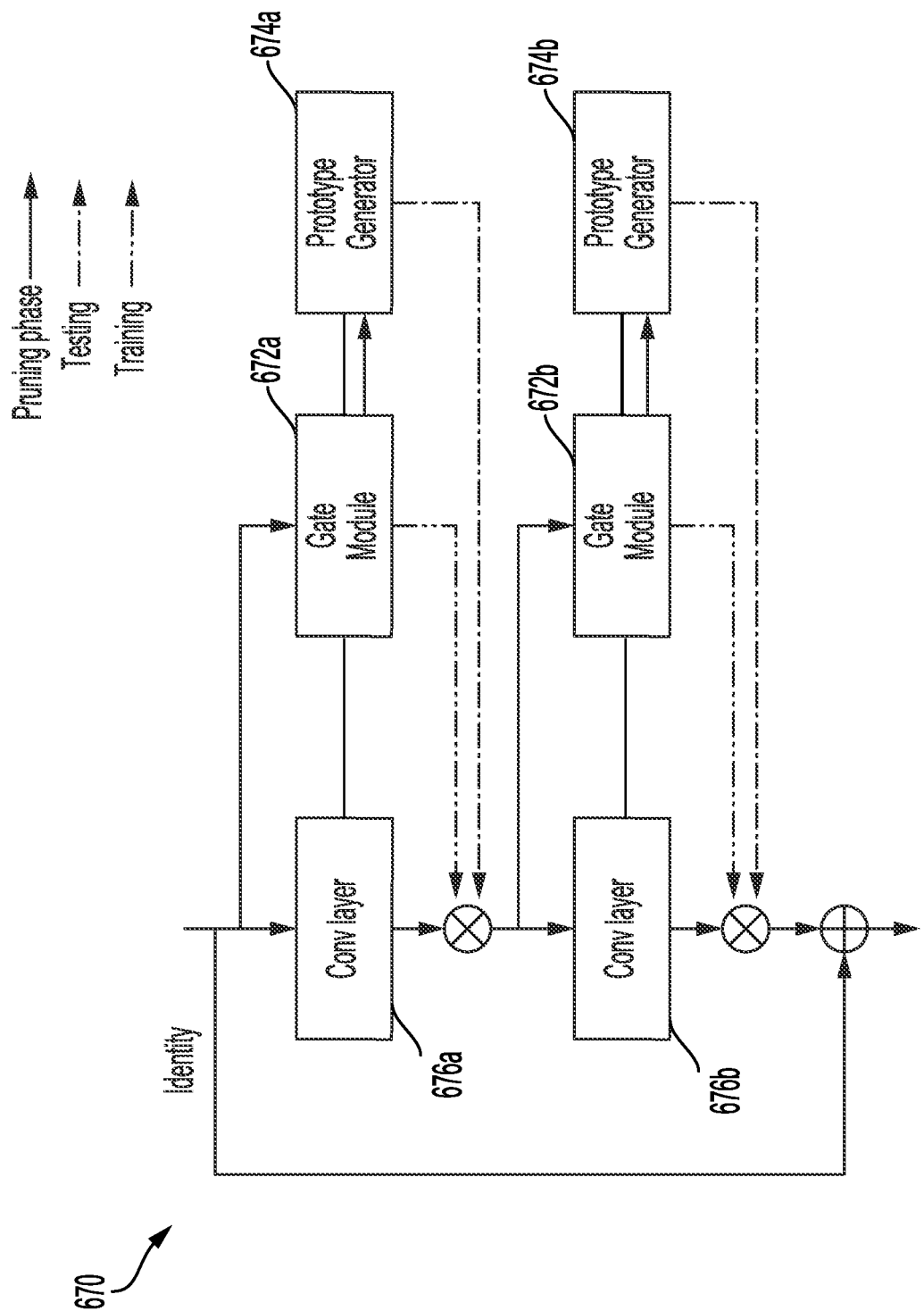
FIG. 6C is a block diagram illustrating an example residual block, in accordance with aspects of the present disclosure.

FIG. 6C is a block diagram illustrating an example residual block 670 of the neural network, in accordance with aspects of the present disclosure. Referring to FIG. 6C, the example residual block 670 of the neural network (e.g., 350 shown in FIG. 3) includes a gate module 672a, 672b and prototype generator 674a, 674b at each convolutional layer 676a, 676b of the neural network. Although two convolutional layers are shown, this is merely an example, for ease of explanation. In this configuration, the gate module 672a, 672b controls each channel of a convolution block rather than the whole residual block 670.

The prototype generator 674 produces a continuous prototype using the output of the gate module 672 for one or more personal identity data based on Equation 2, for example. The prototype generator 674 may also convert the continuous prototype to a discrete prototype through the step function of Equation 3, for instance.

Figure 7:
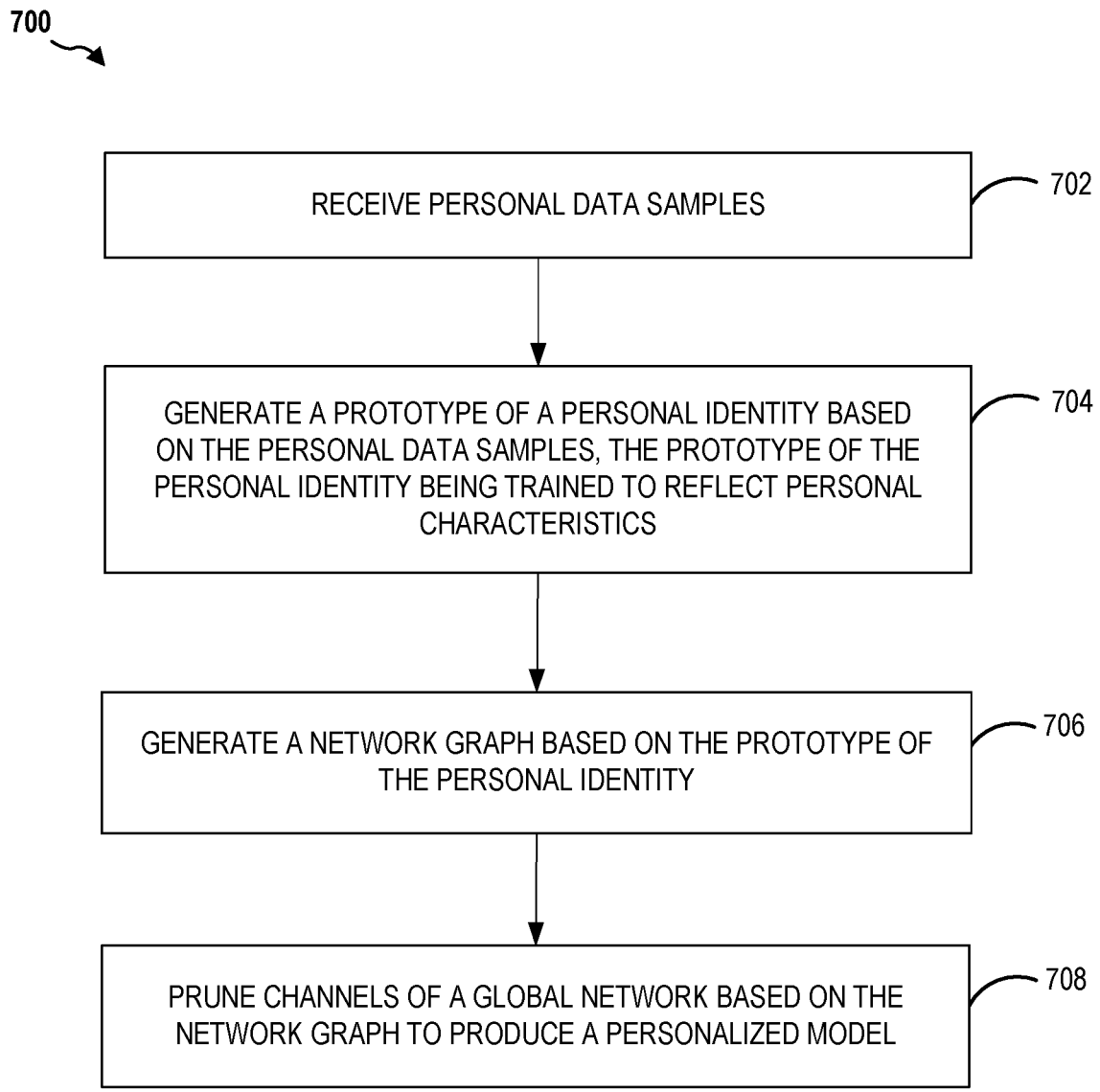
FIG. 7 is a flow chart illustrating an example method for generating a personalized neural network model, in accordance with aspects of the present disclosure.

FIG. 7 is a flow chart illustrating an example method 700 for generating a personalized network model, in accordance with aspects of the present disclosure. As shown in FIG. 7, at block 702, personal data samples are received. In one examples, the personal data samples may be produced via a sensor, such as a camera or microphone.

At block 704, a prototype of a personal identity is generated based on the personal data samples. The prototype of the personal identity is trained to reflect personal characteristics of a user. As described, for example with reference to FIG. 6A, the prototype generator 602 may generate a prototype of the personal identity based on personal data samples such as those via a sensor 608 (e.g., a camera or microphone). The prototype of the personal identity may be generated for each personality, which may be defined as each identity or group of personal data. That is, the prototype may represent a personal identity. In each mini-batch, the number of specific p-th identity data is $n_p$. Then, the mean of embedding vectors among all $z^p$ is calculated. The parameter $\bar{z}^p$ is defined as the mean vector of all p identity in a same batch, representing the personality of p. The set of mean vectors of all p identity in same a batch $\bar{z}^p$ may then be calculated for all convolutional layers. This set of $\bar{z}^p$ is a prototype of p.

At block 706, a network graph is generated based on the prototype of the personal identity. For instance, as described with reference to FIG. 6A, the graph generator 604, may receive the prototypes from the prototype generator 602. The graph generator 604 may determine a network graph structure based on the personal prototypes.

At block 708, channels of a global network are pruned to produce a personalized model based on the network graph. For example, as described with reference to FIG. 6A, the graph structures produced via the graph generator 604 may be supplied, for example, as meta-information to the network pruner 606. Using a full model 610, the network pruner 606 performs a binary determination removing channels of the full model 610 according to the determined graph to generate a small personalized model (shown as the pruned model 612).

Implementation examples are provided in the following numbered clauses:

1. A computer-implemented method comprising:
   receiving one or more personal data samples;
   generating a prototype of a personal identity based on the personal data samples, the prototype of the personal identity being trained to reflect personal characteristics of a user;
   generating a network graph based on the prototype of the personal identity; and
   pruning one or more channels of a global network based on the network graph to produce a personalized model.

2. The computer-implemented method of clause 1, in which the network graph is generated based on a task and a target size for the personalized model.

3. The computer-implemented method of clause 1 or 2, in which the prototype of the personal identity is learned by minimizing a distance between features of the personal data samples and the prototype of the personal identity corresponding to the user.

4. The computer-implemented method of any of clauses 1-3, further comprising:
   receiving an input via the personalized model; and
   generating an inference via the personalized network based on the input.

5. The computer-implemented method of any of clauses 1-4, further comprising:
   receiving an output from the global network; and
   fine-tuning the personalized network based on the output.

6. The computer-implemented method of any of clauses 1-5, in which the prototype of the personal identity is a mean vector of personal data samples in a same batch.

7. The computer-implemented method of any of clauses 1-6, in which the one or more channels are pruned based on a binary determination according to the prototype of the personal identity.

8. An apparatus, comprising:
   a memory; and
   at least one processor coupled to the memory, the at least one processor being configured:
     to receive one or more personal data samples;
     to generate a prototype of a personal identity based on the personal data samples, the prototype of the personal identity being trained to reflect personal characteristics of a user;
     to generate a network graph based on the prototype of the personal identity; and
     to prune one or more channels of a global network based on the network graph to produce a personalized model.

9. The apparatus of clause 8, in which the at least one processor is further configured to generate the network graph based on a task and a target size for the personalized model.

10. The apparatus of claim 8 or 9, in which the at least one processor is further configured to learn the prototype of the personal identity by minimizing a distance between features of the personal data samples and the prototype of the personal identity corresponding to the user.

11. The apparatus of any of clauses 8-10, in which the at least one processor is further configured:

to receive an input via the personalized model; and to generate an inference via the personalized network based on the input.

12. The apparatus of any of clauses 8-11, in which the at least one processor is further configured:

to receive an output from the global network; and to fine-tune the personalized network based on the output.

13. The apparatus of any of clauses 8-12, in which the prototype of the personal identity is a mean vector of personal data samples in a same batch.

14. The apparatus of any of clauses 8-13, in which the one or more channels are pruned based on a binary determination according to the prototype of the personal identity.

15. An apparatus comprising:

means for receiving one or more personal data samples;

means for generating a prototype of a personal identity based on the personal data samples, the prototype of the personal identity being trained to reflect personal characteristics of a user;

means for generating a network graph based on the prototype of the personal identity; and means for pruning one or more channels of a global network based on the network graph to produce a personalized model.

16. The apparatus of clause 15, further comprising means for generating the network graph based on a task and a target size for the personalized model.

17. The apparatus of clause 15 or 16, further comprising means for learning the prototype of the personal identity by minimizing a distance between features of the personal data samples and the prototype of the personal identity corresponding to the user.

18. The apparatus of any of clauses 15-17, further comprising:

means for receiving an input via the personalized model; and means for generating an inference via the personalized network based on the input.

19. The apparatus of any of clauses 15-18, further comprising:

means for receiving an output from the global network; and means for fine-tuning the personalized network based on the output.

20. The apparatus of any of clauses 15-19, in which the prototype of the personal identity is a mean vector of personal data samples in a same batch.

21. The apparatus of any of clauses 15-20, in which the one or more channels are pruned based on a binary determination according to the prototype of the personal identity.

22. A non-transitory computer readable medium having encoded thereon, program code, the program code being executed by a processor and comprising:

program code to receive one or more personal data samples;

program code to generate a prototype of a personal identity based on the personal data samples, the prototype of the personal identity being trained to reflect personal characteristics of a user;

program code to generate a network graph based on the prototype of the personal identity; and program code to prune one or more channels of a global network based on the network graph to produce a personalized model.

23. The non-transitory computer readable medium of clause 22, further comprising program code to generate the network graph based on a task and a target size for the personalized model.

24. The non-transitory computer readable medium of clause 22 or 23, further comprising program code to learn the prototype of the personal identity by minimizing a distance between features of the personal data samples and the prototype of the personal identity corresponding to the user.

25. The non-transitory computer readable medium of any of clauses 22-24, further comprising:

program code to receive an input via the personalized model; and program code to generate an inference via the personalized network based on the input.

26. The non-transitory computer readable medium of any of clauses 22-25, further comprising:

program code to receive an output from the global network; and program code to fine-tune the personalized network based on the output.

27. The non-transitory computer readable medium of any of clauses 22-26, in which the prototype of the personal identity is a mean vector of personal data samples in a same batch.

28. The non-transitory computer readable medium of any of clauses 22-27, in which the one or more channels are pruned based on a binary determination according to the prototype of the personal identity.

In one aspect, the receiving means, the means for generating a prototype of a personal identity, the means for generating a network graph, and/or the pruning means may be the CPU 102, program memory associated with the CPU 102, the dedicated memory block 118, and or NPU 108 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A computer-implemented method comprising:
generating, by a sensor or an input device of an edge device, one or more personal data samples of a user;
generating a prototype of a personal identity based on the one or more personal data samples, the prototype of the personal identity being trained to reflect personal characteristics of a user;
generating a network graph based on the prototype of a personal identity;
pruning one or more channels of a global network based on the network graph to produce a personalized model for deployment on the edge device, the personalized model comprising a convolutional neural network;
receiving an input by the sensor or the input device of the edge device, the input comprising an image associated with the user or speech from the user; and
generating an inference with the personalized model at the edge device based on the input, the inference comprising an image classification in response to the input being the image, or voice processing and/or keyword detection in response to the input comprising the speech.

2. The computer-implemented method of claim 1, in which the network graph is generated based on a task and a target size for the personalized model.

3. The computer-implemented method of claim 1, in which the prototype of the personal identity is learned by minimizing a distance between features of the one or more personal data samples and the prototype of the personal identity corresponding to the user.

4. The computer-implemented method of claim 1, further comprising:
receiving an output from the global network; and
fine-tuning the personalized network based on the output.

5. The computer-implemented method of claim 1, in which the prototype of the personal identity is a mean vector of the one or more personal data samples in a same batch.

6. The computer-implemented method of claim 5, in which the one or more channels are pruned based on a binary determination according to the prototype of the personal identity.

7. An apparatus, comprising:
at least one memory; and
at least one processor coupled to the at least one memory, the at least one processor being configured to:
generate, by a sensor or an input device of an edge device, one or more personal data samples of a user;
generate a prototype of a personal identity based on the one or more personal data samples, the prototype of the personal identity being trained to reflect personal characteristics of a user;
generate a network graph based on the prototype of the personal identity;
prune one or more channels of a global network based on the network graph to produce a personalized model for deployment on the edge device, the personalized model comprising a convolutional neural network;
receive an input by the sensor or the input device of the edge device, the input comprising an image associated with the user or speech from the user; and
generate an inference with the personalized model at the edge device based on the input, the inference comprising an image classification in response to the input comprising the image, or voice processing and/or keyword detection in response to the input comprising the speech.

8. The apparatus of claim 7, in which the at least one processor is further configured to generate the network graph based on a task and a target size for the personalized model.

9. The apparatus of claim 7, in which the at least one processor is further configured to learn the prototype of the personal identity by minimizing a distance between features of the one or more personal data samples and the prototype of the personal identity corresponding to the user.

10. The apparatus of claim 7, in which the at least one processor is further configured:
to receive an output from the global network; and
to fine-tune the personalized network based on the output.

11. The apparatus of claim 7, in which the prototype of the personal identity is a mean vector of the one or more personal data samples in a same batch.

12. The apparatus of claim 7, in which the one or more channels are pruned based on a binary determination according to the prototype of the personal identity.

13. An apparatus comprising:
means for generating, by a sensor or an input device of an edge device, one or more personal data samples of a user;
means for generating prototype of a personal identity based on the one or more personal data samples, the prototype of the personal identity being trained to reflect personal characteristics of a user;
means for generating a network graph based on the prototype of the personal identity;
means for pruning one or more channels of a global network based on the network graph to produce a personalized model for deployment on the edge device, the personalized model comprising a convolutional neural network;
means for receiving an input by the sensor or the input device of the edge device, the input comprising an image associated with the user or speech from the user; and
means for generating an inference with the personalized model at the edge device based on the input, the inference comprising an image classification in response to the input comprising the image, or voice processing and/or keyword detection in response to the input comprising the speech.

14. The apparatus of claim 13, further comprising means for generating the network graph based on a task and a target size for the personalized model.

15. The apparatus of claim 13, further comprising means for learning the prototype of the personal identity by minimizing a distance between features of the one or more personal data samples and the prototype of the personal identity corresponding to the user.

16. The apparatus of claim 13, further comprising:
means for receiving an output from the global network; and
means for fine-tuning the personalized network based on the output.

17. The apparatus of claim 13, in which the prototype of the personal identity is a mean vector of the one or more personal data samples in a same batch.

18. The apparatus of claim 13, in which the one or more channels are pruned based on a binary determination according to the prototype of the personal identity.

19. A non-transitory computer readable medium having encoded thereon, program code, the program code being executed by a processor and comprising:
program code to generate, by a sensor or an input device of an edge device, one or more personal data samples of a user;
program code to generate a prototype of a personal identity based on the one or more personal data samples, the prototype of the personal identity being trained to reflect personal characteristics of a user;
program code to generate a network graph based on the prototype of the personal identity;
program code to prune one or more channels of a global network based on the network graph to produce a personalized model for deployment on the edge device, the personalized model comprising a convolutional neural network;
program code to receive an input by the sensor or the input device of the edge device, the input comprising an image associated with the user or speech from the user; and
program code to generate an inference with the personalized model at the edge device based on the input, the inference comprising an image classification in response to the input comprising the image, or voice processing and/or keyword detection in response to the input comprising the speech.

20. The non-transitory computer readable medium of claim 19, further comprising program code to generate the network graph based on a task and a target size for the personalized model.

21. The non-transitory computer readable medium of claim 19, further comprising program code to learn the prototype of the personal identity by minimizing a distance between features of the one or more personal data samples and the prototype of the personal identity corresponding to the user.

22. The non-transitory computer readable medium of claim 19, further comprising:
program code to receive an output from the global network; and
program code to fine-tune the personalized network based on the output.

23. The non-transitory computer readable medium of claim 19, in which the prototype of the personal identity is a mean vector of the one or more personal data samples in a same batch.

24. The non-transitory computer readable medium of claim 19, in which the one or more channels are pruned based on a binary determination according to the prototype of the personal identity.

* * * * *